(12) United States Patent
Wu et al.

(10) Patent No.: US 8,919,004 B2
(45) Date of Patent: Dec. 30, 2014

(54) DIGITAL FEELER GAUGE AND METHOD OF USING SAME

(71) Applicant: General Electric Company, Schenectady, NY (US)

(72) Inventors: Juntao Wu, Niskayuna, NY (US); Robert William Tait, Niskayuna, NY (US); Cheryl (Chun) Zhan, Niskayuna, NY (US); John Brandon Laflen, Niskayuna, NY (US); Steven William Wik, Schenectady, NY (US); John Herbold, Niskayuna, NY (US); S. M. Shajedul Hasan, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 202 days.

(21) Appl. No.: 13/731,929

(22) Filed: Dec. 31, 2012

(65) Prior Publication Data

US 2014/0109418 A1 Apr. 24, 2014

Related U.S. Application Data

(60) Provisional application No. 61/715,906, filed on Oct. 19, 2012.

(51) Int. Cl.
| | | |
|---|---|---|
| *G01B 7/14* | (2006.01) | |
| *G01B 5/06* | (2006.01) | |
| *G01B 21/08* | (2006.01) | |
| *G01B 21/16* | (2006.01) | |
| *G01B 3/50* | (2006.01) | |

(52) U.S. Cl.
CPC ...... *G01B 5/06* (2013.01); *G01B 21/08* (2013.01); *G01B 21/16* (2013.01); *G01B 3/50* (2013.01); *G01B 2210/58* (2013.01)

USPC ..................................... 33/501.6; 33/501.45

(58) Field of Classification Search
USPC ......... 33/501.08, 501.09, 501.45, 501.6, 613, 33/783, 784
See application file for complete search history.

(56) References Cited

U.S. PATENT DOCUMENTS

| 987,703 A | 3/1911 | Curtin |
|---|---|---|
| 1,661,701 A | 3/1928 | Michler |

(Continued)

FOREIGN PATENT DOCUMENTS

| CH | 265233 A | 11/1949 |
|---|---|---|
| EP | 2620740 A1 | 7/2013 |

(Continued)

OTHER PUBLICATIONS

International Search Report and Written Opinion issued in connection with corresponding Application No. PCT/US2013/064446 on Nov. 25, 2013.

*Primary Examiner* — G. Bradley Bennett
(74) *Attorney, Agent, or Firm* — Scott J. Asmus

(57) ABSTRACT

The present application provides for feeler gauges. The feeler gauges include a plurality of elongate measuring leaves rotatably coupled on a common axis of rotation with an elongate housing. The leaves may be manually, selectively rotatable between a "home" position wherein the leaves are substantially aligned with the housing and an "extended" position wherein the leaves are spaced from the housing. The leaves may be relatively flexible and substantially flat such that they define a substantially constant thickness. One or more extended leaves may be used to measure the thickness of a clearance or gap. The gauges may be configured to detect, determine or measure the thickness of the leaves that are in the "home" position and/or the "extended" position, and thereby determine the total thickness of a clearance or gap measured by the extended leaves.

20 Claims, 5 Drawing Sheets

(56) References Cited

U.S. PATENT DOCUMENTS

| | | | |
|---|---|---|---|
| 4,967,485 A | 11/1990 | Brown et al. | |
| 5,066,205 A | 11/1991 | Ingalls | |
| 5,253,427 A * | 10/1993 | Bartlett | 33/501.08 |
| 5,363,562 A | 11/1994 | Schmidt | |
| 5,665,973 A * | 9/1997 | Christenson | 33/501.45 |
| 6,279,241 B1 * | 8/2001 | Chen | 33/501.45 |
| 6,308,429 B1 | 10/2001 | Green et al. | |
| 6,351,721 B1 | 2/2002 | Werner et al. | |
| 6,438,858 B1 | 8/2002 | Arnold et al. | |
| 6,904,690 B2 * | 6/2005 | Bakke et al. | 33/501.45 |
| 6,931,744 B1 * | 8/2005 | Ikerd et al. | 33/501.45 |
| 7,861,429 B2 * | 1/2011 | Lee | 33/501.45 |
| 2003/0101608 A1 | 6/2003 | McCune et al. | |
| 2004/0200084 A1 * | 10/2004 | Wang | 33/501.45 |
| 2013/0185950 A1 * | 7/2013 | Oode et al. | 33/783 |

FOREIGN PATENT DOCUMENTS

| | | |
|---|---|---|
| JP | 8122048 A | 5/1996 |
| JP | 10332305 A | 12/1998 |

* cited by examiner

DIGITAL FEELER GAUGE AND METHOD OF USING SAME

BACKGROUND

The present application relates generally to gauges for clearance measurements, and more particularly to feeler or thickness gauges for automatically measuring and/or recording gaps or clearances.

Feeler or thickness gauges are heavily used in the industrial environment to measure precise gaps, clearance, spacing, positioning and like, such as in gas turbine, jet engine, calibration tools, etc., which is critical for regular maintenance, process optimization, and vibration mitigation. The feeler gauge itself is typically a hand-held measurement tool that includes several stacked, flat lengths or wires of steel or other relatively sturdy material of the same or different thicknesses called "blades" or "leaves." The blades or leaves may be stacked in graduating thickness arrangement. The body of each leaf is typically of a substantially constant thickness (i.e., substantially parallel sides), and each leaf includes a thickness marking or other indication corresponding to the thickness of the particular leaf. For example, feeler gauges typically include two sets of measurements markings—one set of imperial units (typically measured in thousandths of an inch) and another set in metric units (typically measured in hundredths of a millimeter). Some feeler gauges include leaves that have a tapered edge to, for example, facilitate the insertion of the leaves between two adjacent components. Such gauges are commonly referred to as "taper feeler gauges."

Both "regular" feeler gauges including leaves with flat tips and "taper" feeler gauges typically also include a casing or housing configured to rotatably couple the leaves in a stacked relationship. In particular, proximate one end of the leaves (the non-tapered end in taper feeler gauges) is a pin, rivet, hinge or other mechanism or configuration that allows for each leaf to independently rotate about a common axis of rotation. The casing or housing may also include a handle portion that surrounds the exposed sides of the "top" and "bottom" leaves. In such embodiments, the leaves can be rotated or pivoted about the axis of rotation so that all of the leaves are in a stacked, aligned orientation and positioned within the handle portion. Similarly, from such a "home" orientation one or more of the leaves can be rotated out from the handle and into an "extended" position.

Although the leaves are relatively sturdy and strong, the leaves and/or the hinge mechanism are sufficiently flexible so that leaves may be "bent" or otherwise deformed by a user such that a portion of two or more extended leaves distal from the axis of rotation are stacked together in an abutting relationship. For example, several non-adjacent leaves can be extended from the handle portion, if present, and substantially aligned, and then compressed or otherwise caused to be deformed such that at least the portions of the leaves adjacent the distal tips thereof are tightly stacked together in an abutting relationship to for an overall thickness. Stated differently, the leaves and/or the hinge mechanism is/are configured such that the space or gap between substantially aligned, non-adjacent, extended leaves can be reduced and substantially eliminated such that the substantially aligned extended leaves lie alongside each other. In this manner, differing combinations of the leaves of a feeler gauge can be rotated into an extended position such that they are spaced from the handle portion of the housing or casing (if present) and deformed so that they are "stacked" or otherwise combined to form a single extended "measuring blade." Thereby, a "measuring blade" may be either a single extended leaf or a combination of extended stacked leaves.

In use, individual or differing combinations of extended leaves can be used to form "measuring blades" of varying thicknesses to measure tolerances, point gaps or any other critical spaces, gaps or clearances. For example, individual leaves can be sequentially extended and, at least attempted to be, inserted into a clearance or space between components depending upon the fit, or lack thereof, within the clearance. As another example, if a particular combination of stacked, extended leaves results in a measuring blade with a thickness that does not fit within a particular clearance between components (i.e., the tip of the measuring blade cannot be inserted in the clearance or space), one of the blades can be retracted and, thereby, the measuring blade thickness decreased. The user of the feeler gauge can then attempt to insert the new thinner measuring blade combination between the components. If the new thinner measuring blade can be inserted within the clearance, but includes a significant gap or spacing between the measuring blade and the components (i.e., fits too loosely), another leaf can be extended and a new thicker measuring blade formed. The new thicker measuring blade can then be retested for fit within the clearance between the components. Using such a trial-and-error method a measuring blade with a thickness that snuggly fits within, and thereby substantially corresponds to, the clearance between the components can ultimately be achieved. It is noted that the trial and error process of a feeler gauge utilizes the "feel" of the user to a significant degree. Experienced feeler gauge technicians have developed skills and know-how gained through experience and training to accurately use a feeler gauge.

Once a user has achieved a particular "measuring blade" with a thickness that substantially corresponds to a particular clearance, spacing or gap, the thickness indication provided on each of the individual leaves comprising the measuring blade can be manually read by the user, manually summed (if multiple leaves were used) and manually recorded to determine the numerical thickness or size of the particular clearance. The nature of current feeler gauges dictates such a manual measurement determination process. In fact, under typical current practices two workers are often required to perform a measurement with a feeler gauge: one worker physically handles the gauge and takes the measurement determination via a particular measurement blade, and the other worker records the measurement with respect to an indication of the particular clearance being measured. One of the workers must also have manually summed the individual blades or leaves forming the measuring blade to thereby make the gap or clearance measurement (if multiple leaves were used). Human-induced error is therefore ineluctable during this process, which thereby requires time consuming measurement repetition and, occasionally, disastrous improper alignment, adjustment or positioning of components.

Accordingly, it would be desirable to reduce or substantially eliminate the manual steps involved in determining and recording a gap or clearance measurement using a feeler gauge after a particular set of measurement leaves or blades is determined by a user (e.g., a skilled technician) to correspond to the size of the particular gap or clearance being measured. Such a measuring system should be highly accurate, efficient and allow for more objective determinations.

BRIEF DESCRIPTION

In accordance with one aspect of the present disclosure, a feeler gauge for measuring the thickness of a gap is disclosed.

The gauge includes a housing, a plurality of measuring leaves and a measurement determination mechanism. The plurality of measuring leaves are rotatably coupled to the housing along a common axis of rotation and selectively movable between a home position and an extended position. Each measuring leaf defines an elongate, substantially flat shape defining a thickness, and one or more extended leaves can be inserted into the gap such that the combined thickness of the one or more extended leaves substantially corresponds to the thickness of the gap. The measurement determination mechanism is configured to determine the thickness of the gap by at least one of detecting which of the leaves are in the extended position and/or home position, measuring the total thickness of the leaves in the extended position, and measuring the total thickness of the leaves in the home position. The gauge is also configured to at least one of display the thickness of the gap on a display, transmit a signal representing the thickness of the gap to a computing device. The computing device can be a local device or remote device. For example, the user can employ a local device that receives and processes the signals from the gauge. The signals in one example are communicated to a remote device such as a maintenance department for processing.

In some such embodiments, the leaves may be coupled in a substantially stacked orientation at the axis of rotation. In some such embodiments, the measurement determination mechanism may include a manual engageable member configured to initiate the gap thickness determination. In some other such embodiments, the measurement determination mechanism may be configured to determine the thickness of the gap by measuring the thickness of the leaves in the home or extended position.

In some such embodiments, the measurement determination mechanism may be configured to determine the thickness of the gap by comparing the measured thickness of the leaves in the home position with the overall thickness of all of the leaves of the gauge. In some such embodiments, the measurement determination mechanism may be configured to measure and record the thickness of all of the leaves of the gauge. In some such embodiments, the housing may includes an upper member, a lower member and an interior cavity between the upper and lower members, and a leaf may be considered in the home position when the leaf is oriented about the axis of rotation such that the leaf is positioned substantially in the interior cavity of the housing.

In some such embodiments, the measurement determination mechanism may include a compression member configured to apply a compressive force to a portion of the leaves in the home position distal the axis of rotation of a degree sufficient to at least substantially eliminate space between adjacent leaves in the home position due to one or more leaves being in the extended position. In some such embodiments, the gauge may be configured to at least automatically display the thickness of the gap on the display or transmit the signal representing the thickness of the gap to the computing device once the compressive force is applied.

In accordance with another aspect of the present disclosure, another feeler gauge for measuring the thickness of a gap is disclosed. The gauge includes a housing, a plurality measuring leaves and a measurement determination mechanism. The housing includes a top member, a bottom member and a cavity between the top and bottom members. The plurality measuring leaves are elongate, substantially flat measuring leaves each defining a thickness. The leaves are rotatably coupled along a common axis of rotation within the cavity of the housing at a first portion proximate the leaves. The leaves are selectively rotatable about the axis of rotation between a home position where a second portion of the leaves distal the first portion is positioned substantially within the cavity of the housing and an extended position where the first portion is substantially spaced from within the cavity of the housing. One or more extended leaves can be inserted into the gap such that the overall thickness of the one or more extended leaves substantially corresponds to the thickness of the gap. The measurement determination mechanism is configured to determine the thickness of the gap by measuring the thickness of the leaves in the home position. The gauge is also configured to at least one of display the thickness of the gap on a display of the gauge or transmit a signal representing the thickness of the gap to a computing device.

In some embodiments, the first portion of the leaves may be proximate a first end of the leaves, and the second portion of the leaves may be proximate a second end of the leaves. In some such embodiments, the measurement determination mechanism may include a manually engageable moveable member configured for translation within at least one of the first and second members of the housing proximate the second portion of the leaves, into the cavity of the housing and into contact with an adjacent leaf in the home position.

In some embodiments, the manually engageable moveable member may be configured to apply a compressive force to the leaves in the home position between the manually engageable moveable member and at least one of the first and second members of the housing of a sufficient degree to at least substantially eliminate space between the leaves in the home position due to one or more leaves being in the extended position.

In some embodiments, the gauge may be configured to at least automatically display the thickness of the gap on the display or transmit the signal representing the thickness of the gap to the computing device once the said compressive force of a sufficient degree is achieved. In some embodiments, the measurement determination mechanism may be configured to detect the amount of translation of the manually engageable moveable member from a neutral position to an actuated position. In some embodiments, the actuated position may be defined by the position of the manually engageable moveable member when the said compressive force of a sufficient degree is achieved. In some embodiments, the gauge may be configured to determine the thickness of the leaves in the home position based on the amount of translation of the manually engageable moveable member and the thickness of the gap being measured by contrasting the thickness of the leaves in the home position with the total thickness of all the leaves in the gauge.

In accordance with another aspect of the present disclosure, a method of using a feeler gauge to measure the thickness of a gap is disclosed. The method includes obtaining a feeler gauge including a housing, a plurality of measuring leaves, a measurement determination mechanism and a display for displaying the thickness of the gap. The plurality of measuring leaves are rotatably coupled to the housing along a common axis of rotation and being selectively movable between a home position and an extended position. Each measuring leaf defines an elongate, substantially flat shape defining a thickness. The measurement determination mechanism is configured to determine the thickness of the gap by at least one of detecting which of the leaves are in the extended position compared to the home position, measuring the thickness of the leaves in the extended position, and measuring the thickness of the leaves in the home position. The method further includes the step of positioning one or more of the leaves in the extended position such that the combined thickness of the one or more extended leaves substantially corresponds to the thickness of the gap. The method further includes the step of initiating the measurement determination mechanism to determine the thickness of the gap and display the thickness of the gap on the display.

In some embodiments, initiating the measurement determination mechanism may include engaging a manually engageable member of the measurement determination mechanism. In some embodiments, the measurement determination mechanism may be configured to determine the thickness of the gap by measuring the thickness of the leaves in the home position. In some embodiments, the measurement determination mechanism may utilize the thickness measurement of the leaves in the home position to determine the thickness of the gap by contrasting the thickness measurement of the leaves in the home position with the total thickness of all of the leaves of the gauge. In some embodiments, the measurement determination mechanism may be configured to apply a compressive force to the leaves in the home position of a sufficient degree to at least substantially eliminate space between the leaves in the home position due to one or more leaves being in the extended position. In some embodiments, the gauge may be configured to determine the thickness of the gap once the said compressive force of a sufficient degree is achieved.

DRAWINGS

DETAILED DESCRIPTION

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters are not exclusive of other parameters of the disclosed embodiments. Components, aspects, features, configurations, arrangements, uses and the like described, illustrated or otherwise disclosed herein with respect to any particular embodiment may similarly be applied to any other embodiment disclosed herein.

Figure 1:
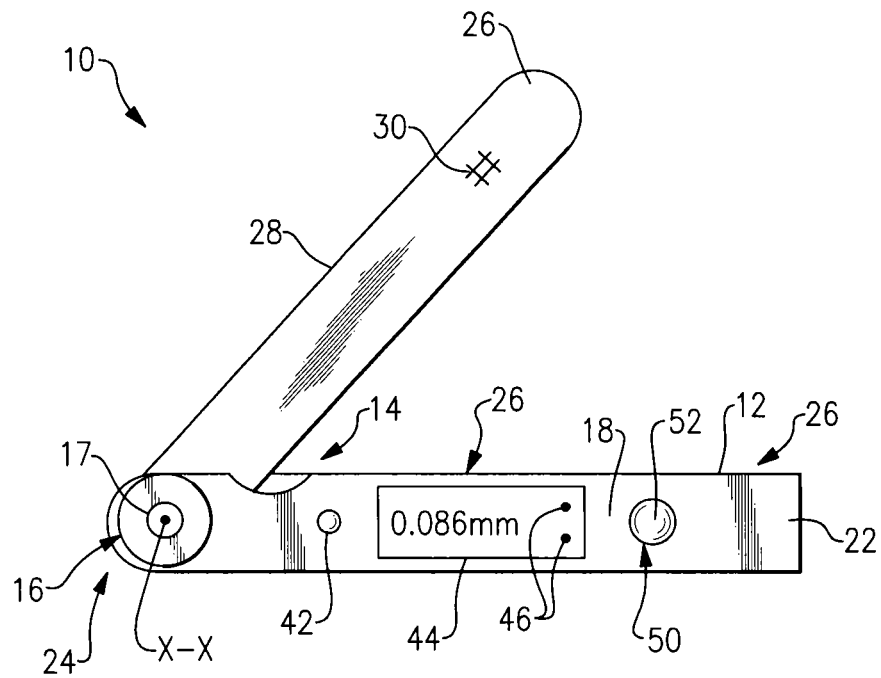
FIG. 1 is a top view of a first exemplary feeler gauge for measuring a gap.
Figure 2:
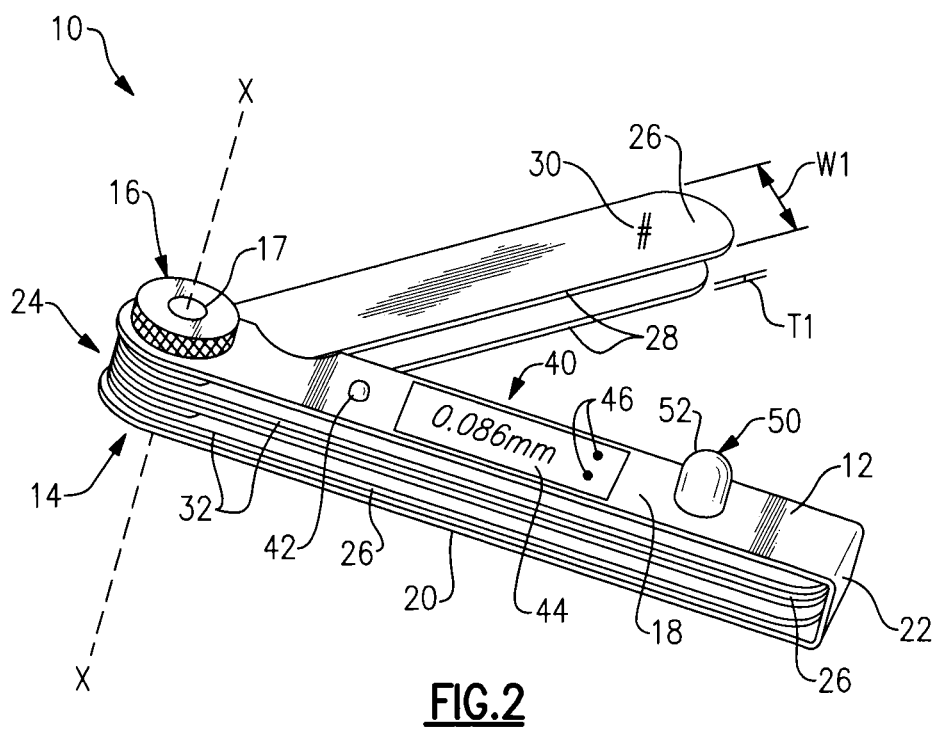
FIG. 2 is a perspective view of the first exemplary feeler gauge of FIG. 1.

FIGS. 1 and 2 illustrate an exemplary feeler gauge that includes a handle, housing or casing 12 and a set of blades or leaves 14 rotatably coupled to the housing 12 via a rotation mechanism 16. As best shown in FIG. 2, the housing 12 may be U-shaped such that the housing 12 includes a first portion 18 (one leg of the "U") that is positioned on one side of the set of blades or leaves 14 and a second portion 20 (the other leg of the "U") that is positioned on the other side of the set of leaves 14 opposing the first portion 18. Stated differently, the feeler gauge 10 may be configured such that the set of leaves or blades 14 is positioned at least partially between the first and second portions 18, 20 of the housing 12, as shown in FIG. 1. In some such U-shaped housing 12 embodiments, the housing 12 may include a third portion 22 that extends between the first and second portions 22 and longitudinally past a second end 26 of each blade of the set of leaves 14 (depending upon the selective position of the leaves 14), as shown in FIG. 2.

The first and second portions 18, 20 of the housing 12 may be sized and shaped similar to the lateral side surfaces or profile of the leaves 14, as shown in FIG. 1, such that when the leaves 14 are rotated about the rotation mechanism 16 (as discussed further below) the top and bottom leaves of the set of leaves 14 are fully covered and thereby protected by the first and second portions 18, 20, respectively. Similarly, the third portion 22 of the housing 12 may be sized and shaped to completely or substantially cover the second ends 26 of the leaves 14 so that when the leaves 14 are rotated into alignment with the third portion 22 the second ends 26 are completely or substantially covered and thereby protected by the third portion 22 of the housing 12, as shown best by FIG. 2. In some alternative embodiments, however, the housing 12 may not be provided, may be provided without at least one of the first, second and third portions 18, 20, 22, provided with other portions, the first, second and third portions 18, 20, 22 may be sized and shaped differently than the leaves 12, or combinations thereof. In some embodiments, the housing 12 may be made from relatively sturdy material or combinations of materials, such as metal or durable plastics. As discussed further below, the housing 12 may include manual engageable elements, displays mechanisms, handles or any other mechanism for facilitating thickness measurement, recording, displaying, transmitting and the like of gap or clearance measurements based on a particular selection of one or more extended blade 14 corresponding to the particular gap or clearance being measured.

As shown in FIGS. 1 and 2, the leaves 14 may be rotatably coupled to each other via a rotation mechanism 16 that defines an axis of rotation X-X. The rotation mechanism 16 may also rotatably couple the leaves 14 to the housing 12. The rotation mechanism 16 may be any mechanism or configuration capable of allowing the individual leaves of the set of leaves 14 to rotate about the axis of rotation X-X. The rotation mechanism 16 may also function to couple the leaves 14, at least partially, in a stacked, abutting relationship. For example, as shown best in the exemplary illustrated embodiment of FIG. 2 the rotation mechanism 16 may include a pin or other like member 17 passing through a portion of the leaves 14 proximate a first end 24 of the leaves 14. The pin member or other mechanism 17 may include threads and at least one threaded nut to selectively secure the leaves 14 to the each other and the housing 12. In such a configuration, the nut and/or pin member 17 may be selectively rotated to more tightly or more loosely secure the leaves 14. Similarly, the rotation mechanism 16 may allow for the addition and removal of one or more leaves 14, such as when a leaf 14 becomes damaged. Any other rotation mechanism or configuration 16 may be used that allows one or more of such features. For example, a rotation mechanism 16 may be used that does not include a pin member passing through the leaves 14.

The blades or leaves 14 may be made from any material and may be in any form capable of being used to measure gaps or clearances. The leaves 14 may take the form of leaves or blades of typical or common feeler or thickness gauges known in the art. In the illustrated exemplary embodiment, the leaves 14 are substantially planar, elongate lengths of metal. The leaves 14 may be elongate in a direction extending from a first end 24 to the second end 26 thereof. As the leaves may be substantially flat, the leaves 14 can be, at least partially, stacked in an abutting relationship to form a set of leaves 14. The thickness T1 of each individual leaf 14 may vary, or one or more leaves 14 may include the same thickness T1. For example, the thickness T1 of each leaf 14 may sequentially increase from the leaf 14 adjacent the first or second portion 18, 20 of the housing 12 to the other of the first or second portion 18, 20. As another example, two or more of the leaves 14 may define the same thickness T1. Each leaf 14 may include indicia or other marking 30 that indicate the thickness T1 of the leaf 14, as shown in FIGS. 1 and 2.

In some embodiments, the entirety of each leaf 14 may be substantially flat and uniform. In other embodiments, the second "free" end 26 of the leaves 14 may be tapered. Such a tapered second free end 26 (not shown) may assist the user in guiding or locating the leaves 14 into a clearance.

A portion of leaves 14 proximate the first end 24 thereof may be rotationally coupled to the other leaves 14 and the housing 12 via the pin or other rotational mechanism 16, as shown in FIGS. 1 and 2. As such, the axis of rotation X-X of the leaves 14 may pass through the portion of leaves 14 proximate the first end 24. In such an arrangement, the second end 26 of the leaves 14 may define the portion of the leaves positioned furthest from the axis of rotation X-X. As the leaves are rotated about the axis of rotation X-X from a position where the leaves 14 are in a stacked, substantially aligned orientation or arrangement with each other and the housing 12, the second end 26 can be the initial portion of the blade 14 that is exposed along its entire width W1. Depending upon the particular leaf of the set or stack of leaves 14 being rotated, the rotated leaf 14 will either be extended out from between two adjacent leaves 14 or from an adjacent blade 14 and the housing 12, as shown in FIGS. 1 and 2.

In use, a particular leaf 14 can be initially extended by the user by manually rotating the leaf 14 about the axis X-X such that the leaf 14 is rotationally displaced from the stack of substantially aligned leaves 14 positioned at least partially within the housing 12. The initially extended leaf 14 can attempted to be inserted between adjacent components (i.e., in a clearance) in the thickness T1 direction of the leaf 14. If the "extended" leaf 14 fits relatively snuggly in the clearance, the thickness T1 of the particular extended leaf 14 corresponds to the thickness or size of the clearance. Such a leaf 14 may be considered a "measurement blade" as it effectively measures the clearance in which it is inserted. As discussed further below, a measurement determination mechanism 50 may be utilized by the user to, at least partially, digitally determine, display, store or transmit the thickness measurement of the gap or clearance based on the thickness of the particular measurement blade. It is noted that the experience and skill of the user may be relevant in determining if a particular leaf or combination of leaves 14, fits sufficiently in a clearance such that the thickness T1 of the particular extended leaf 14 or leaves 14 corresponds to the thickness or size of the clearance (i.e., is a measuring blade). It is also noted that as non-digital feeler gauges have been used in industry for quite some time, and have become widely used, many relevant users are already trained and skilled in utilizing the leaves 14 of a feeler gauge 10 to manually determine a "measuring blade" and thereby measure a gap or clearance.

If the particular initially extended leaf 14 either does not fit in the clearance or fits relatively loosely within the clearance, the leaf 14 can be retracted to a position such that the leaf 14 is in a stacked, substantially aligned orientation or arrangement with the non-extended leaves 14 and, potentially, the housing 12. By utilizing the thickness indicia 30 on the leaves 14, for example, and depending upon the fit of the initially extended leaf 14 in the clearance (e.g., the initially extended leaf 14 did not fit, fit too tightly or fit too loosely), a subsequent thicker or thinner leaf 14 can be extended and attempted to be inserted into the clearance. This trial and error process may be repeated until a particular leaf 14 fits relatively snuggly in the clearance and, therefore, corresponds to the thickness or size (i.e., measurement) of the gap or clearance. Again, as discussed further below a measurement determination mechanism 50 may be utilized by the user to, at least partially, digitally determine, display, store or transmit the thickness measurement of the gap clearance via the extended leaf 14.

In other embodiments, a user may utilize more than one leaf 14 of the gauge 10 to measure a clearance. For example, a user may utilize more than one leaf 14 because the gauge 10 may not include a single leaf 14 that defines a thickness that corresponds to a particular gap or clearance being measured. As another example, based on the preference and/or experience of the user, the user may which to supplement an initially extended leaf 14 or supplement or swap a leaf 14 of an initially extended combination of leaves 14 with an additional leaf 14 that the user believes may correspond to the deficiency of the of the initially extended leaf or leaves 14. Stated differently and making use a specific example, if a user initially extends a single leaf 14 and determines that the initially extended leaf 14 fits too loosely within a clearance, and the user believes (from experience and skill, for example) that the leaf 14 is too thin by about 2 millimeters, the user may extend a 2 millimeters leaf from the set of leaves 14 within the housing 12. The user may then squeeze or otherwise compress the two extended leaves 14 together, such as proximate the second ends 26 thereof, to form a stacked, abutting arrangement of the leaves 14. The combination of leaves 14 can then be inserted into the clearance and determined whether the combination corresponds to the clearance (i.e., the combination of extended leaves 14 being a "measuring blade" with a combined thickness (T1+T1) that corresponds to the clearance). This trial and error process may be repeated if the combination of leaves 14 does not correspond to the clearance. Once the user has determined that a combination of leaves 14 corresponds to a gap or clearance (i.e., the combination of leaves 14 is a "measuring blade"), the measurement determination mechanism 50 may be used to utilize to, at least partially, digitally determine, display, store or transmit the measurement of the clearance by making use of the differing positions of the extended leaves 14 comprising the measuring blade and the retracted unused leaves 14 located within the housing 12, as explained further below.

Similarly, if a combination of leaves 14 is being used to measure a clearance, and the user determines that the combination is too thin or thick as compared to a clearance, the user may swap one of the leaves 14 of the combination of leaves 14 for a thinner or thicker leaf 14 and/or add or subtract a leaf 14 to/from the combination of leaves 14. The user then would combine the new combination of leaves 14 (e.g., via compression) and insert the new combination of leaves 14 into the clearance. This trial and error process may be repeated if the thickness of the combination of leaves 14 does not correspond to the clearance. Again, once the user determines that a particular combination of leaves 14 corresponds to the clearance (i.e., the combination of leaves 14 is a measuring blade), the measurement determination mechanism 50 may be used to, at least partially, digitally determine, display, store or transmit the measurement of the clearance by making use of the differing positions of the extended leaves 14 comprising the measuring blade and the retracted unused leaves 14 located within the housing 12, as explained further below.

The measurement determination mechanism 50 of the gauge 10 may be any mechanism capable of at least producing a digital determination of the thickness of the clearance being measured once the user concludes that a particular leaf 14 or combination of leaves 14 corresponds to the clearance (i.e., once the user establishes a measuring blade). The measurement determination mechanism 50 may also, at least partially, display, store or transmit a measurement of a clearance based on a user-determined measuring blade. In some embodiments, the measurement determination mechanism 50 may utilize the difference in the position of the retracted, substantially aligned or stacked "home" leaves 14 in the housing 12 about the axis X-X as compared to the position of the extended blade 14 or leaves 14 encompassing the measuring blade about the axis X-X to at least partially digitally determine, display, store or transmit the measurement of the clearance. In such embodiments, the determination mechanism 50 may include any components necessary or capable of utilizing, at least in part, the relative positions of the extended leaf or leaves 14 of the measuring blade and the other non-extended or refracted "home" leaf or leaves 14 to digitize the measurement of a clearance.

For example, in the non-limiting illustrated exemplary embodiment of FIGS. 1 and 2 the measurement determination mechanism 50 of the exemplary gauge 10 includes an exemplary manually engageable member 52. The manually engageable member 52 and/or related components may be provided on the housing 12 and configured to selectively or automatically interact with the non-extended or retracted leaves 14 of the set of leaves 12 positioned in the housing 12. As shown in FIG. 2, when a leaf 14 is extended into a "use" position to measure a clearance, a gap or space 32 is created in the stack of leaves 14 in the retracted or "home" position in the handle 12 corresponding to where the extended leaf 14 was previously positioned before being extended. Specifically, the gap or space 32 may extend along the length of the stack of leaves 14 in the housing 12 from a portion proximate the first ends 14 of the leaves 14 to the second ends 26 of the leaves 14.

In such a configuration or arrangement, the engageable member 52 may be at least a part of a push-button style caliper or similar mechanism. When depressed (or automatically biased into a depressed position), the engageable member 52 or any related member(s) operably coupled thereto may act to compress the retracted leaves 14 in the "home" position within the housing 12 and eliminate the gaps 32 corresponding to the extended "in-use" leaves 14. For example, if the engageable member 52 or related member is positioned on or about the first portion 18 of the housing 12, the engageable member 52 or related components may initially contact the retracted leaf 14 that is immediately adjacent the engageable member 52 or related member(s) when the engageable member 52 is initially depressed. Further depression of the engageable member 52 may cause the engageable member 52 or related member(s) or components(s) to apply a force to the adjacent retracted leaf 14. Such force may be transmitted through the stack of retracted "home" leaves 14 and, eventually, to the second housing portion 20. In this manner, the retracted leaves 14 can be compressed between the engageable member 52 or related component(s) and the second housing portion 20 by the depression or other engagement/ movement of the engageable member 52 to eliminate or remove the gaps 32 in the stack of leaves 14 caused by, or resulting from, the extended leaves 14. In other words, in one embodiment, a sufficient degree of force is applied such that the measurement accounts for adjacent or consecutive leaves that are not in the portion to the measured. The sufficient degree of force depends upon the design criteria and the measurement determination mechanism and in one example is a calibrated force.

The particular design, arrangement or configuration of the measurement determination mechanism 50 and any related component(s), such as the engageable member 52 thereof, that digitally records or determines the thickness measurement of the retracted "home" leaves 14 may vary. For example, the measurement determination mechanism 50 mechanism may be capacitor-based, optical-based, resistor-based, magnetic-based, inductance-based, notch pattern-based or any other effective or operable methodology or combinations thereof.

In some embodiments including a push-button style caliper or similar mechanism as at least part of the measurement determination mechanism 50, any mechanism, apparatuses or the like capable of detecting or responding to the physical position of at least a portion of the push-button style caliper or similar mechanism, such as the engageable member 52, and producing, outputting or otherwise creating a corresponding electrical or digital signal (or data) may be used with the gauge 10. In some such embodiments, the measurement determination mechanism 50 may include an element or component that is affected by the position of the engageable member 52 or related component(s) and thereby produces or results in a corresponding electrical signal or the like. In such an embodiment, the gauge 10 may be operative to equate or associate the particular electrical signal or the like to a particular thickness measurement. For example, the particular electrical signal or the like may be utilized via a lookup table or calculation to convert or associate the electrical signal or the like to a predetermined, calibrated thickness measurement. As described further below, the gauge 10 may be further configured to contrast the thickness measurement determined by the measurement determination mechanism 50 of the retracted "home" leaves 14 when the one or more gaps 32 caused by the one or more corresponding extended leaves 14 (i.e., the one or more leaves 14 creating a measurement blade) are eliminated and a benchmark, reference or standard thickness measurement of all of the leaves 14 of the gauge 10 to obtain a digital measurement (e.g., data corresponding to the measurement) of the measuring blade and, thereby, the clearance being measured.

The gauge 10 may thereby include other components necessary for digitally measuring clearances based on a determination by a user that a particular extended leaf or combination of leaves 14 (i.e., a measuring blade) corresponds to the gap or clearance being measured. For example, the gauge may 10 include one or more microprocessor, printed circuit board, memory component (including instructions, data, algorithms and the like saved therein), processor, power source or supply (e.g., a battery, a serial interface (e.g., USB, RS232, and/or AC/DC transformer) or power generator), visual indicator components (e.g., display, LEDs, etc.), audible indication components, controller, sensor, transmitter, antenna, transceiver, system bus architecture and/or direct memory access component, other circuitry components and the like.

The engageable member 52 and any related components may also be operable to determine a reference, benchmark or standard thickness of the stack of leaves 14 with all of the leaves 14 in the retracted position in the housing 12. Such a reference thickness can represent the entire thickness of the leaves 14 present in the gauge 10. The reference thickness of the stack of leaves 14 may be digitally recorded, stored or otherwise used as a reference point. The reference thickness of the leaves 14 of the gauge 10 may be determined in the same or substantially similar manner in which the combined thickness of the retracted or "home" leaves 14 is measured when some of the leaves 14 are in the "extended" or non-retracted position, as described above (see FIGS. 1 and 2), except that all of the leaves 14 are placed in their retracted "home" position in the housing 12. For example, in use a user may retract all of the leaves 14 in the housing 12 and utilize a user interface 40 of the gauge 10 to "tell" the gauge 10 that the subsequent or past thickness measurement is the benchmark, reference or standard thickness of the leaves 14 of the gauge 10, as shown FIGS. 1 and 2. More specifically, as also shown in FIGS. 1 and 2, the user interface 40 may include a calibration button or other manually engageable mechanism 42 that can be engaged by the user to "instruct" the gauge 10 that a particular thickness measurement taken via the engageable member 52 and any related component(s) is the reference thickness.

The gauge 10 may be effective in digitally determining a clearance measurement by use of the measurement determination mechanism 50 (of any form) by comparing the reference thickness of the leaves 14 of the gauge 10 and the thickness measurement of the retracted leaves 14 in the "home" position when the user has extended one or more leaves 14 and, thereby, determined a measuring blade. More specifically, the gauge 10 may be effective in digitally determining a clearance measurement by subtracting the thickness determination of the retracted "home" leaves 14 (via the measurement determination mechanism 50 when the user determines a measuring blade) from the benchmark measurement which was previously determined by the user (also via measurement determination mechanism 50). Stated differently, the gauge 10 may be configured to read or determine the thickness of the measuring blade via determining or measuring the thickness change of the retracted unused leaves 14 in the "home" position in the housing 12. Such a digital method or configuration to read, measure or determine a clearance measurement using the unused retracted leaves 14 of a feeler gauge 10 is counter to the traditional manual method or configuration in which the thickness T1 of each extended leaf or leaves 14 encompassing the measuring blade is manually read, and potentially manually summed, to arrive at the clearance measurement.

As the clearance determination of some exemplary gauge 10 embodiments may utilize the benchmark or reference thickness measurement, the selective nature of the determination of the benchmark or reference thickness measurement is advantageous. As noted above, the gauge 10 may include a calibration mechanism 42 for programming the reference thickness measurement of all the leaves 14. Thereby, the gauge 10 allows for compensation of the reference thickness due to wear, breakage, removal or leaves, replacement leaves, additional leaves, etc. To compensate for such leaf or blade wear, replacement or other alternations, the gauge 10 may be recalibrated by reestablishing the benchmark or reference thickness measurement. For example, before a clearance measurement is attempted a user may utilize a first engageable member of the calibration mechanism 42 on the housing 12 and the second engageable member 52 of the measurement determination mechanism 50 to calibrate the benchmark or reference measurement of the gauge 10 based on the wear of the leaves 14 and the configurations of leaves 14 in the gauge 10. Similarly, if one or more of the leaves 14 is removed, added and/or replaced, the benchmark or reference measurement of the gauge 10 can be recalibrated. In this manner, the gauge 10 can maintain continuously accurate measurements regardless of the wear, condition or configuration of the leaves 14 of the gauge 10.

The display 40 of the gauge 10 may include other engageable and/or visual and tactile indicators other than those in connection with the measurement determination mechanism 50 and/or the calibration mechanism 42. For example, the housing 12 of the gauge 10 may include an LCD screen or other display mechanism 44, as shown in FIGS. 1 and 2. In some such embodiments, the gauge 10 may be configured such that the when the user activates the measurement determination mechanism 50, such as by engaging the engageable member 52 thereof, the gauge 10 determines the corresponding clearance being measured, as described above, and visually indicates the numerical measurement via the display 44.

The gauge 10 may also include other visual and/or tactile indicators. In some embodiments, the gauge 10 may be configured to transmit a determined clearance measurement or conduct automatic registration, such as wirelessly or through a wired connection. Therefore, the gauge 10 may include any mechanism or configuration for facilitating or achieving such a transmitting or registration feature. For example, the gauge 10 may include an antenna mechanism, such as a radio frequency antenna, for wirelessly transmitting or registering clearance measurement data to a computing device and/or a hard-wired port configured for transmitting or registering clearance measurement data though a wired connection to a computing device. The gauge 10 may be configured such that the user is able to instruct the gauge 10 to transmit or register a recently acquired clearance measurement, such as the last determined clearance measurement. In some such embodiments, the engageable member 52 of the measurement determination mechanism 50 and related components of the gauge 10 may be configured such that engagement of the engageable member 52 of the measurement determination mechanism 50 for a period of time after a clearance measurement is determined (and potentially displayed on the display 44), such transfer of the clearance measurement is effectuate (e.g., transmitted or registered) to a computing device.

In gauge 10 embodiments that are configured to provide clearance measurement data transmission or registration, the display 44 or the housing 12 may include one or more transfer visual indicators 46, such as LEDs, that indicates such sending and receiving of the measurement data, as shown in FIGS. 1 and 2. In some embodiments, the display 44 or the housing 12 may include a LED light of one color 46 that illuminates to indicate that the measurement data is in the process of transmitting or has successfully been transmitted, and another LED light of another color 46 that illuminates to indicate that the measurement data is in the process of being received or has successfully been received by a computing device, as also shown in FIGS. 1 and 2.

In some embodiments, the gauge 10 may include a battery and an antenna mechanism powered at least in part by the battery and configured for transmitting or registering clearance measurement data to a computing device via radio frequency transmissions. In such an embodiment, the gauge 10 may include a configuration or an arrangement that guards against accidental engagement of one or more engagement member, such as the exemplary engagement member 52 of the measurement determination mechanism 50 occurring by the user's handling of the gauge 10. Such accidental engagement of one or more engagement member of the gauge 10 may unintentionally activate the transition or registration feature and thereby wasted radio frequency transmissions and battery life. To prevent such accidental activation of the wireless transmitting mechanism, some gauge 10 embodiments may be configured such that engagement or depression of an engageable member activates a controller provided on or in the housing 12 to select a random time interval. For example, double engagement of an engageable member may activate the controller. In such embodiments, the gauge 10 may be configured such that the controller waits the random time and then transmits a signal, or directs a signal to be sent, to one or more visual indicator to cue the user. The visual indicator may be one or more illumination mechanisms (e.g., visual indicators 46). In such embodiments, the gauge 10 may be configured such that after the user is cued via the visual indicator, engagement of an engagement mechanism by the user activates transmission or registration of data corresponding to a previously determined clearance measurement to a computing device. For example, double engagement of an engageable member may activate transmission or registration of clearance measurement data. Described more broadly, to prevent accidental engagement of engagement mechanisms by the user which would result is wasted transmissions and battery life, a gauge 10 may be configured such that engagement of one or more engagement mechanisms initiates a visible indicator cue to the operator of the potential transmission or registration. Then, if transmission or registration of clearance measurement data is desired by the user (i.e., was not accidental), a gauge 10 may be configured such that the user is required to again engage one or more engagement mechanisms to initiate such transmission or registration.

In gauge 10 embodiments that are configured for wireless transmission or registration of clearance measurement data to a computing device, the gauge 10 may include a loop (magnetic) antenna. Such a gauge 10 configuration may advantageously include lower sensitivity to the proximity of dielectric tissue of the user during use as compared to other wireless configurations. For example, the housing 12 of the gauge 10 may be metallic and the loop antenna may be incorporated into the housing 12 to improve wireless communication performance.

Feeler gauge 10 configurations that are adapted for producing digital data corresponding to clearance measurements determined by the measurement leaves 14 and wireless transmission of such clearance measurement data allow for clearance measurements to be taken and recorded with the feeler gauge 10 by one person. Such one-person use of the feeler gauge 10 eliminates, or at least substantially decreases, human error associated with prior art feeler gauges because the clearance measurement data registration process is fully automatic. Further, an additional benefit of such a feeler gauge 10, as those described herein, is that clearance measurement data can be processed in real-time by, for example, a remote data center. Such real-time clearance measurement data can be utilized and provide valuable feedback to a control system for timely optimization or proper maintenance of the subject apparatus defining the gaps or clearance(s) being measured by the gauge 10. For example, a user may be given otherwise directed to a particular gap or clearance or a series of particular gaps or clearances of an apparatus or multiple apparatuses. The user can then employ the leaves of the gauge 10 to measure each clearance via appropriate measuring blades, digitally determine each measuring blade thickness and thereby the clearance measurement via the measurement determination mechanism 50, and transmit the digital data corresponding to clearance measurement to a computing device. The computing device may be configured to automatically register the received digital measurements with an indication of the particular clearance being measured. In this way, a user may follow a list or other registry of gaps or clearances and measure each of the clearances presented on the list with a gauge 10, and automatically register, transfer or upload each measurement to a local device, such as an iPad®, that links or otherwise associates each measurement with its particular clearance identification as indicated on the list.

In some alternative embodiments, the measurement determination mechanism 50 of the gauge 10 may be alternatively configured such that only the extended leaves 14 comprising the measurement blade (as determined by the user), as opposed to the retracted or unused leaves 14 "home" in the housing 12 and all of the leaves 14 of the gauge 10, may be utilized to digitally measure, determine, record, display and/or transmit a particular clearance measurement. The measurement determination mechanism 50 and/or the components of the gauge 10, such as the leaves 14 and the pin mechanism 16, may be comprised or configured in any manner capable of producing electrical signal(s), indication(s) or the like indicative of which leaves 14 are extended and, thereby, comprise a particular measuring blade (which corresponds to the thickness or size (i.e., measurement) of the clearance being measured).

In some such gauge 10 embodiments that are configured to determine or detect the one or more leaves 14 forming the measuring blade during a clearance measurement, the measurement determination mechanism 50 may include one or more mechanisms that produce or otherwise result in a signal or other detectable physical quantity or impulse indication corresponding to leaves 14 in the "extended" position (and thereby forming the measuring blade) as compared to those in the "home" or non-used, retracted position in the housing 12. For example, such exemplary gauges 10 may include a mechanism operably coupled to each blade 14 that is effective in regulating current by means of variable resistances corresponding to the rotational position of the related blade 14. In some such embodiments, the mechanism operably coupled to each leaf 14 may be a resistor. For example, the mechanism operably coupled to each leaf 14 may vary resistance as the leaves 14 are rotated about the axis of rotation X-X thereof. In such embodiments, the variable resistance mechanism of each leaf 14 may be associated or operably coupled to the rotational mechanism 17. For example, in some embodiments the gauge 10 may include a rheostat operably coupled to each leaf 14 and the rotational mechanism 17, and the gauge 10 may be otherwise configured to detect which of the leaves 14 are in the "extended" position based on the resistance provided by the rheostats (i.e., the resistance of each rheostats is dependent upon the rotational position of a corresponding leaf 14).

Figure 3:
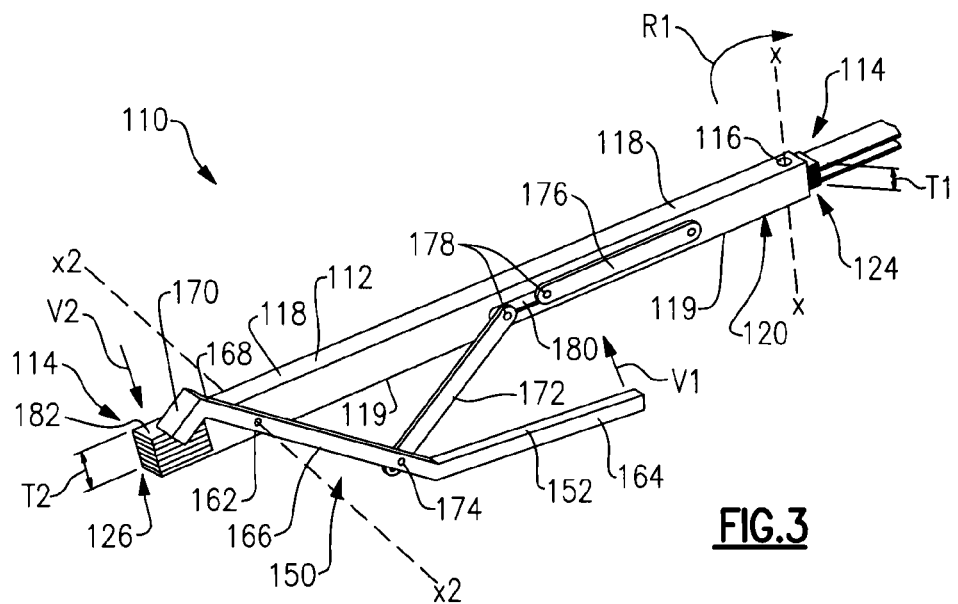
FIG. 3 is a perspective view of a portion of a second exemplary feeler gauge for measuring a gap.

FIG. 3 shows a portion of an exemplary alternative embodiment of a feeler gauge generally indicated by reference numeral 110. Exemplary feeler gauge 110 is similar to the exemplary feeler gauges described above and therefore like reference numerals preceded by the numeral "1" are used to indicate like elements. The description above with respect to the other exemplary feeler gauges, including description regarding alternative embodiments (i.e., modifications, variations or the like), equally applies to exemplary feeler gauge 110 (and any alternative embodiments thereof). As shown in FIG. 3, inter alia, the exemplary measurement determination mechanism 150 of exemplary feeler gauge 110 differs from the exemplary measurement determination mechanism 50 of exemplary feeler gauge 10.

As can be seen in FIG. 3, exemplary feeler gauge 110 is configured to make a digital measurement determination of the leaves 114 that are oriented in the "home" position (i.e., the leaves 114 that have not been extended from the handle 112). As described above, such a thickness measurement of "home" leaves 114 can be used to calculate or otherwise determine the thickness of any extended leaves forming a measuring blade (i.e., the thickness of the gap or clearance being measured). For example, a "home" thickness determined when a measuring blade is formed (i.e., at least one leaf 114 is in the "extended" position) may be compared to the thickness of the entire set of leaves 114 (i.e., no leaves 114 extended) to determine the measuring blade thickness and therefore the measurement of the clearance being measured. Such a calibration thickness (the thickness of all of the leaves 114 of the gauge 110) may be obtained via the feeler gauge 110 before or after the measurement of the home leaves when a measuring blade is formed. In some embodiments, the calibration thickness may be preprogrammed in the gauge 110 and only potentially recalibrated periodically or after an event, such as when a leaf is replaced, a leaf is broken, wear on a leaf is present, etc.

In the illustrated exemplary embodiment of FIG. 3, the manually engageable member 152 of the portion of the feeler gauge 110 is configured as a lever pivoting about pivot point 162 forming an axis of rotation X2-X2. The exemplary manually engageable member 152 is positioned on a side of the leaves 114 such that the housing 12 includes a third portion 119 extending between the first and second portions 118, 120. As the third portion 119 of the housing 12 is positioned within the area of rotation of the leaves 114 about the axis of rotation X-X, the leaves 114 are only able to substantially rotate or swing out from within the housing 112 in one direction R1 (as the opposing direction about the axis of rotation X-X is substantially blocked by the third portion 119), as shown in FIG. 3.

The exemplary manually engageable member 152 of the exemplary feeler gauge 110 illustrated in FIG. 3 includes an engageable portion 164 that defines the free end of the manually engageable member 152. In the illustrated embodiment, the engageable portion 164 is positioned on a first side of the housing 112 adjacent the bottom or second housing portion 120. As also shown in FIG. 3, an exemplary intermediary portion 166 of the manually engageable member 152 may extend between the engageable portion 164 and a head portion 170 that is positioned, at least partially, on a second side of the housing 112 and leaves 114 adjacent the top or first portion 118 of the handle 12 that opposes the first side thereof. The intermediary portion 166 of the manually engageable member 152 may be rotatably coupled to the third portion 119 of the housing 112 at a fulcrum or rotation point 162 such that the intermediary portion 166, and therefore the manually engageable member 152 itself, is capable of rotating with respect to the housing 112 about a fulcrum axis of rotation X2-X2 defined by the fulcrum or rotation point 162. In some non-limiting embodiments, the fulcrum axis X2-X2 of the intermediary portion 166, and therefore the manually engageable member 152 itself, may be orientated substantially perpendicular to the axis of rotation X-X of the leaves 114.

The relative position of the manually engageable member 152 about the fulcrum 162 and fulcrum axis X2-X2 defined thereby may be determinative of the position of the head portion 170 relative to the other components of the exemplary gauge 110. For example, as shown in FIG. 3 the manually engageable member 152 may be configured and oriented with respect to the housing 112 about the fulcrum 162 and fulcrum axis X2-X2 defined thereby such that the head portion 170 is positioned adjacent the first portion or side 118 of the housing 112 and leaves 114, and the engageable portion 164 is positioned adjacent the second portion or side 120 of the housing 112 and leaves 114 that opposes the first side 118 thereof.

In such an embodiment, a user may grasp the housing 112 of the feeler gauge 110 in the palm of their hand with their fingers positioned over the engageable portion 164 of the manually engageable member 152 and their thumb and or upper palm over the first or top portion 118 of the housing 112. In such a position, the user can flex or squeeze their hand to rotate the manually engageable member 152 about the fulcrum 162 and fulcrum axis X2-X2 defined thereby via the engageable member 164 such that the engageable portion 164 is biased in a direction V1 towards the second or bottom portion 118 of the housing 112 and the head portion 170 is biased in a direction V2 towards the first or top portion 118 of the housing 112. As the manually engageable member 152 is rotated about the fulcrum axis X2-X2 defined by the fulcrum 162, the direction V1 that the engageable portion 164 is biased and the direction V2 that the head portion 170 is biased are opposing directions, as shown in FIG. 3.

As also shown in FIG. 3, the head portion 170 of the manually engageable member 152 may be configured to overlap or otherwise be positioned adjacent the first or top portion 119 of the housing 112. In this manner, the intermediary portion 166 may extend along the third portion or side 119 of the of the housing 112 to the head portion 170, and the head portion 170 may be shaped or otherwise configured to extend over the first or top portion 119 of the housing 112. In some embodiments, such as the exemplary illustrated embodiment of FIG. 3, at least the top portion 118 of the housing 112 may be cut away or shorter than the leaves 114 such that at least the top surface of the free ends 126 of the leaves 114 (the ends distal from the axis of rotation X-X and corresponding rotation mechanism 16) are exposed. In such an arrangement, downward movement or translation of the head portion 170 in the direction V2 will cause the head portion 170 to interact with the top surface 182 of the top leaf of the leaves 114 in the "home" position. It is noted that downward movement or translation of the head portion 170 in the direction V2 can be caused by upward motion V1 of the engageable portion 164 which forces the manually engageable member 152 to rotate at the fulcrum 162 about the fulcrum axis X2-X2 defined thereby.

Once the head portion 170 initially interacts with the top surface 182 of the top leaf of the leaves 114 in the "home" position, further rotation or rotational force of the manually engageable member 152 about the fulcrum axis X2-X2, such as resulting from force being applied in the upward direction V1 to the engageable portion 164, will act to further translate the head portion 170 in the direction V2 to compress the leaves 114 in the "home" position against the second or bottom portion 120 of the housing 112. In this way, any gaps between adjacent leaves 114 in the "home" position of the handle 112, caused by one or more leaves being in an "extended" position for example, can be substantially eliminated. Once a user is satisfied that any gaps or spaces (in the thickness direction) of the leaves 114 in the home position have been substantially eliminated by the head portion 170, the user may effectuate a digital thickness measurement of the extended leaves 114, i.e., the thickness measurement of the measuring blade. The user may effectuate a digital thickness measurement by engagement with another member, maintaining the manually engageable member 152 in a particular position for a particular time, by simply releasing the manually engageable member 152 with the user's hand, etc. Further, the digital thickness measurement of the extended leaves 114 may be determined via comparison of a thickness calibration determination comprising all of the leaves 114 of the gauge 110 (i.e., the thickness of all of the leaves 114 of the gauge 110 oriented in the "home" position).

As shown in FIG. 3, the exemplary illustrated feeler gauge 110 may include a first measurement member 172 rotatably coupled to the intermediary portion 166 of the manually engageable member 152 at junction 174. The first measurement member 172 may extend from the junction 174 with the intermediary portion 166 to the fourth side wall portion 119 of housing 112. More specifically, the free end of the first measurement member 172 opposing the junction 174 may be operably joined to the fourth side wall portion 119 at junction 178. Both junctions 174 and 178 of the first measurement member 172 may be configured such that at least the second junction 178 is slidably coupled to the fourth side wall 119. For example, the first junction 174 may allow for rotational movement, while the second junction 178 and related components thereof may be configured for both rotational and sliding motion. In such a configuration, upward movement in the direction (V1) of the engageable portion 164 of the manually engageable member 152 (and therefore rotation about the fulcrum axis X2-X2) may result in at least the junction 178 of the first measurement member 172 moving substantially linearly longitudinally along the length of the leaves 114 and housing 112 (the direction depending upon the rotational direction of the manual engageable member 152 about the axis X-X of rotation).

As shown in FIG. 3, the gauge 110 may also include a second measurement member 176 operably coupled to the fourth side or portion of the housing 112 in similar way than the first measurement member 172. The first and second measurement members 172, 176 may also couple via the junction 178. For illustrative purposes only, the first and second measurement members 172 are not shown as coupled at junction 178 in FIG. 3. When coupled, however, like the first measurement member 172 the second measurement member 176 may be configured to slide substantially linearly longitudinally along the length of the leaves 114 and housing 112 when the manually engageable member 152 is rotated about the fulcrum axis X2-X2, such as via a force applied to the engageable portion 164 in the upward V1 direction (e.g., by the squeeze of a user's hand).

The exemplary feeler gauge of FIG. 3 may utilize the substantially linear movement of the first and/or second measurement members 172, 176 to determine the thickness of a particular measuring blade, and thereby a particular clearance being measured. For example, as illustrated in FIG. 3 a linear measurement determination mechanism 180 may be provided on or about the housing 12 and the first and/or second measurement members 172, 176. The linear measurement determination mechanism 180 may be any electronic or electro-mechanical mechanism capable of detecting and digitally representing the substantially linear movement of the first and/or second measurement members 172, 176 with respect to the linear measurement determination mechanism 180 and/or the housing 112. For example, a first portion of the linear measurement determination mechanism 180 may be coupled to the housing 112 of the gauge and a corresponding second portion of the mechanism 180 may be coupled to the first and/or second measurement members 172, 176 configured to move over or otherwise associate with the first portion of the linear measurement determination mechanism 180. In some such embodiments, the first portion of the linear measurement determination mechanism 180 may include a series of equally spaced magnetic members, and the second portion of the linear measurement determination mechanism 180 may be one or more antenna or like mechanism capable of detecting the number of magnetic members passing by the one or more antenna or like mechanism (or vice versa).

In such an arrangement, the amount or distance of linear movement of the first and/or second measurement members 172, 176 is relative to the angular degree that the manually engageable member 152 is rotated about the fulcrum axis X2-X2. Further, the degree to which the manually engageable member 152 is rotated about the fulcrum axis X2-X2 is determinative of the available distance in the downward direction V2 that the head portion 170 can travel. In this way, a user is able to squeeze and thereby drive the engageable portion 164 of the manually engageable member 152 toward the housing 112. As the manually engageable member 152 is continually driven about the fulcrum axis X2-X2 via the engageable portion 164, the head portion 170 is driven into the top surface 182 of the upper most "home" position leaf 114 and proceeds to push the upper most leaf against the other "home" position leaves 114 and the second or bottom portion of the housing 112 until substantially all gaps or space between the leaves 114 formed by "extended" leaves 114 or otherwise are eliminate. Once the "home" leaves are forcibly, reasonably tightly stacked by the head portion 170, the manually engageable member 152 is prevented from further rotation about the fulcrum axis X2-X2. Also as the manually engageable member 152 is continually driven about the fulcrum axis X2-X2 via the engageable portion 164, the first and/or second measurement members 172, 176 pivot at junction 174 and are driven substantially linearly along the housing 112, and their movement is determined by the linear measurement determination mechanism 180.

In this manner, because the total traveled distance of the first and/or second measurement members 172, 176, as measured by the linear measurement determination mechanism 180, is indicative of, or at least related to, the distance the head portion 170 of the manually engageable member 152 traveled to "bottom out" the leaves 114 in the "home" position, the digital measurement of the total traveled linear distance of the first and/or second measurement members 172, 176 can be utilized to determine the thickness of the leaves 114 in the home position. For example, the gauge 110 can be configured or calibrated to scale the digital length determination of the travel of the first and/or second measurement members 172, 176 to the proper corresponding digital thickness measurement of the "home" leaves 114. Similarly, a digital benchmark measurement may be taken and/or stored corresponding to the total thickness of all of the leaves 114 of the gauge 110 before a clearance measurement (such as a digital measurement utilizing the gauge 110 with all of the leaves in the "home" position), and the digital thickness measurement of the "home" leaves 114 during a particular measurement may be compared to the benchmark measurement to achieve a digital measurement of the extended leaves (i.e., the measuring blade) and thereby the particular clearance being measured.

FIGS. 4-7 show portions of an exemplary alternative embodiment of a feeler gauge generally indicated by reference numeral 210. Exemplary feeler gauge 210 is similar to the exemplary feeler gauges described above and therefore like reference numerals preceded by the numeral "2" are used to indicate like elements. The description above with respect to the other exemplary digital feeler gauges, including description regarding alternative embodiments (i.e., modifications, variations or the like), equally applies to exemplary feeler gauge 210 (and any alternative embodiments thereof). As shown in FIG. 3, inter alia, the exemplary measurement determination mechanism 250 of exemplary feeler gauge 210 differs from the exemplary measurement determination mechanism 50 of exemplary feeler gauge 10 and exemplary measurement determination mechanism 150 of exemplary feeler gauge 110.

Figure 4:
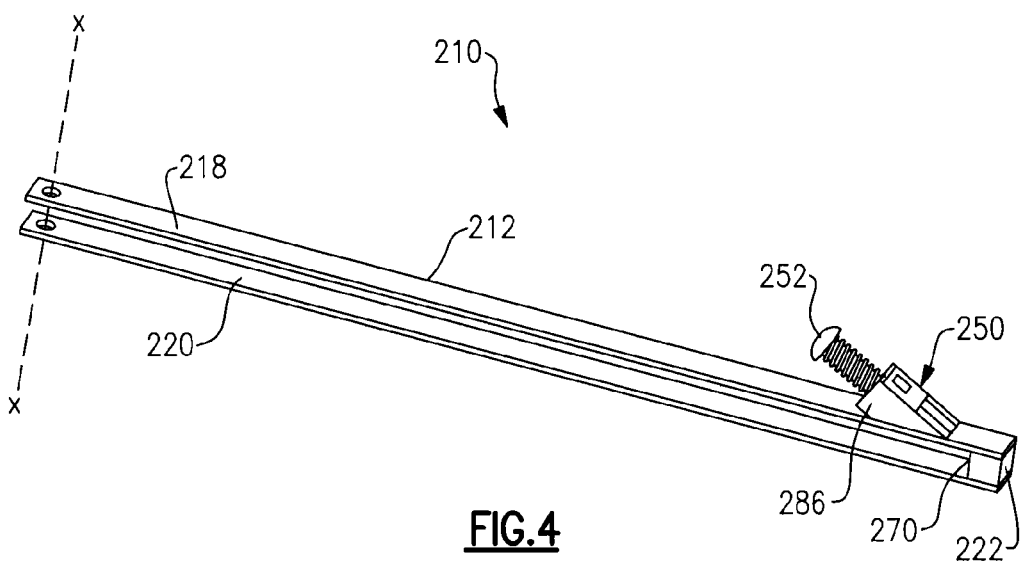
FIG. 4 is a perspective view of a portion of a third exemplary feeler gauge assembly for measuring a gap.
Figure 5:
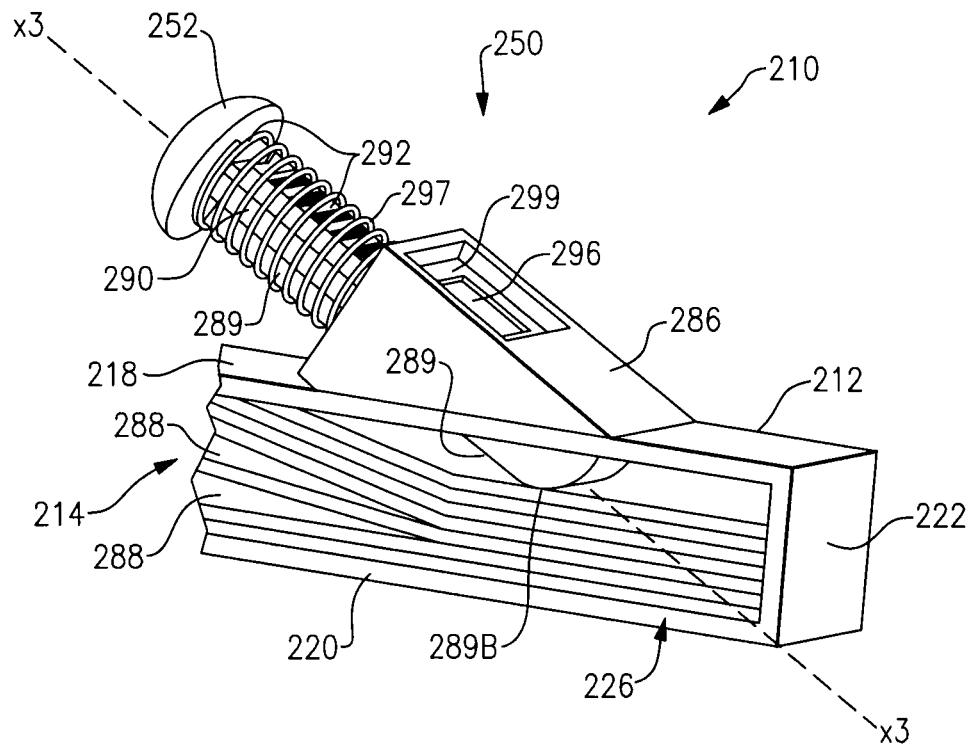
FIG. 5 is an enlarged perspective view of the third exemplary feeler gauge of FIG. 4.

As can be seen in FIGS. 4 and 5, exemplary feeler gauge 210 is configured to obtain or determine a digital measurement of the leaves 214 (see FIG. 2) that are oriented in the "home" position (i.e., the leaves 214 that have not been extended from the handle 212) via the measurement determination mechanism 250. As described above, such a thickness measurement of "home" leaves 214 can be used to calculate or otherwise determine the thickness of any extended leaves that correspond to the thickness of the gap or clearance being measured (i.e., calculate the thickness of the clearance being measured). For example, such a "home" thickness determined when at least one leaf 214 is in the "extended" position may be compared to a benchmark or reference thickness corresponding to the thickness of the entire set of leaves 214 (i.e., no leaves 214 extended) to determine the thickness of the one or more extended leaves 214, and therefore the measurement of the clearance being measured with the or more extended leaves 214. Such a reference thickness (the thickness of all of the leaves 214 of the gauge 210) may be obtained via the feeler gauge 210 before or after the measurement of the home leaves when a measuring blade is formed. In some embodiments, the reference thickness may be preprogrammed in the gauge 210. In such embodiments, the reference thickness may be updated (e.g., reprogrammed, remeasured or the like) periodically or after an "event," such as when a leaf 114 is replaced, a leaf 214 is broken, excessive wear on a leaf 214 is present, etc. In yet another embodiment, the gauge 210 may be configured to convert such a "home" thickness into the thickness of a corresponding measuring blade (the total thickness of any extended leaves 214) by way of a theoretical or other non-measured reference thickness (i.e., total overall thickness of the leaves 214). For example, if the gauge 210 is designed or intended to include leaves 214 defining a total or overall thickness of "X", the gauge 210 may be programmed or otherwise configured to utilize "X" as the reference thickness whether or not the actual leaves 214 in the gauge 214 truly or accurately define a total or overall thickness of "X."

Figure 7:
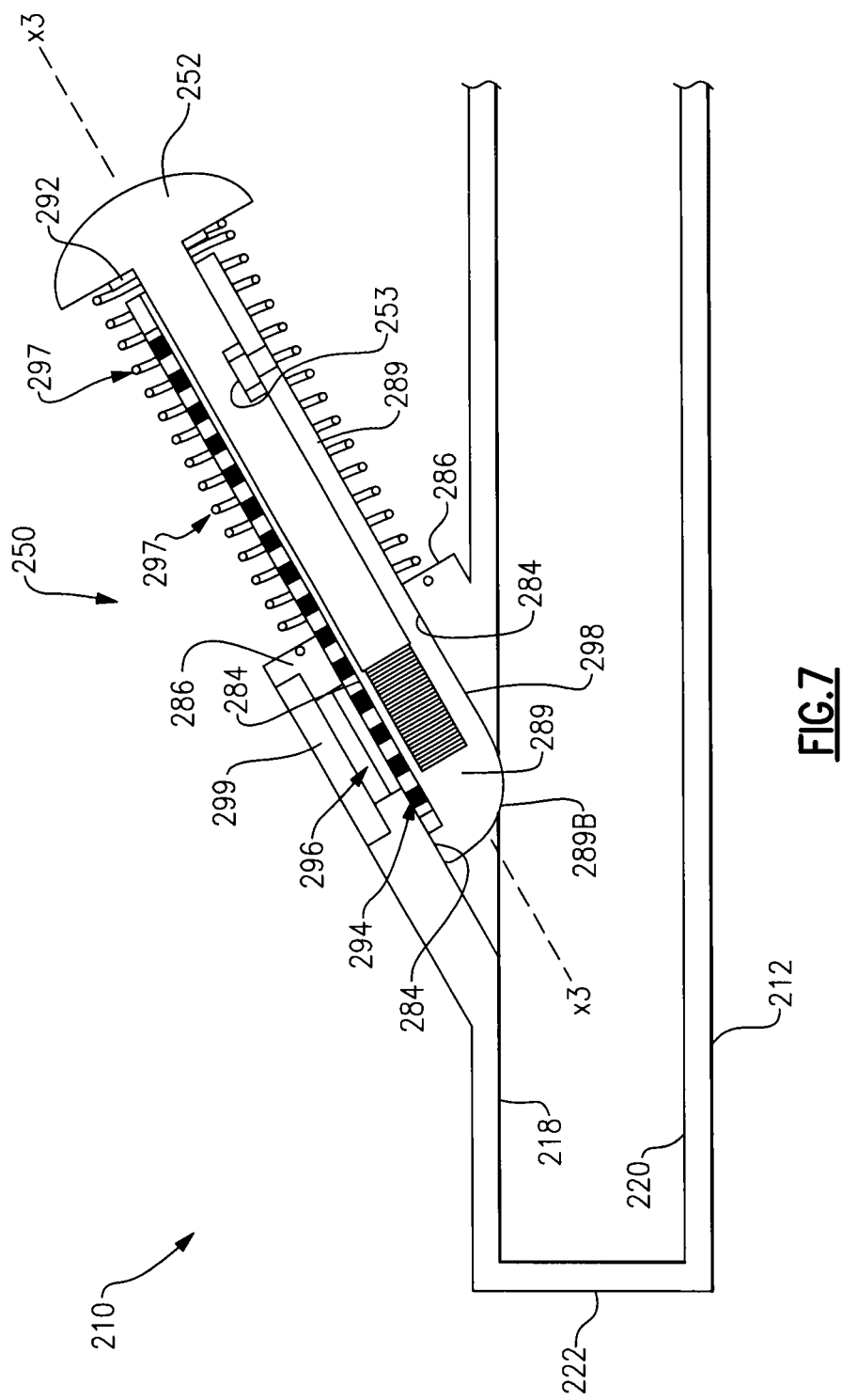
FIG. 7 is a cross-sectional view of the third exemplary feeler gauge of FIG. 4.

As best shown in FIGS. 4, 5 and 7, the exemplary measurement determination mechanism 250 of exemplary gauge 210 is a push-button style actuator. As such, the exemplary manually engageable member 252 of the measurement determination mechanism 250 is a manually engageable push button or like member. In the exemplary illustrated embodiment, the measurement determination mechanism 250 is a mushroom shaped push button wherein the "head" portion is exposed and positioned above the top or first portion 218 of the housing 212 and the "stem" portion extends from the head portion towards the bottom or second portion of the housing 220. As shown in FIG. 7, the stem portion may extend through a channel or other passageway 284 through the top portion 218 of the housing 212. The top portion 218 of the housing 212 may also include a boss or other protruding feature 286, and the top portion 218 of the housing 212 and boss 286 may together form the channel 284, as shown in FIGS. 4, 5 and 7.

The measurement determination mechanism 250 may be positioned distal the axis of rotation X-X of the leaves 214, such that the measurement determination mechanism 250 interacts with the second or distal end 226 of the leaves 214. As described previously, such a configuration may allow the measurement determination mechanism 250 to compress the leaves 214 in the "home" position at their distal ends 226 to substantially eliminate any gaps or spaces 288 between adjacent leaves 214 caused by leaves 214 being rotated out from the housing 212 and into an "extended" position, as best shown in FIG. 5. In the exemplary illustrated embodiment, the measurement determination mechanism 250 is proximate the third portion 222 of the housing 212 distal the axis of rotation X-X of the leaves 214 and oriented on an angle along an axis X3-X3 with respect to the leaves 214 and housing 212 such that actuation of the manually engageable member 252 causes components of the measurement determination mechanism 250 to travel along the axis X3-X3 from the top portion 218 to the bottom portion 220 of the housing 212 and towards the third distal portion 222 of the housing 212.

Figure 6:
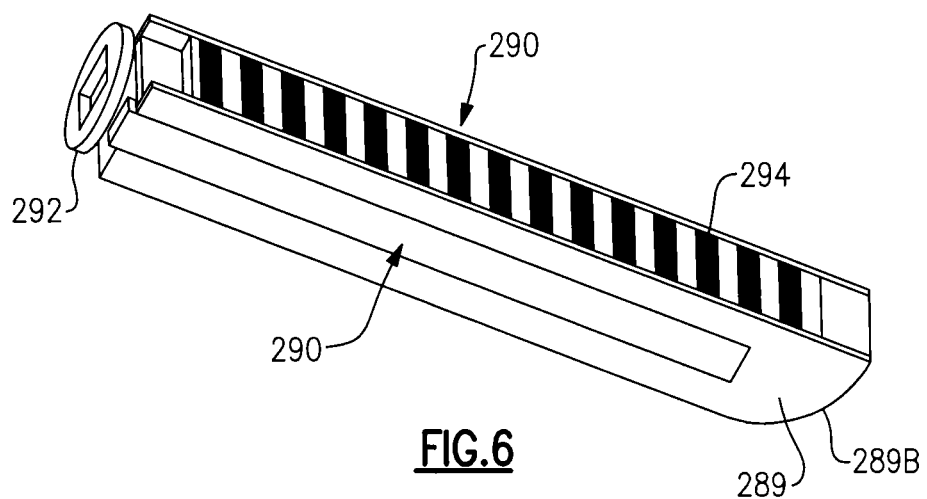
FIG. 6 is a perspective view of a portion of a measurement determination mechanism of the feeler gauge of FIG. 4.

With respect to FIGS. 6 and 7, the measurement determination mechanism 250 may also include a member housing 289 configured to operably couple to the manually engageable member 252 and extend the measurement determination mechanism 250 along the actuation axis X3-X3 into the interior of the housing 212. The bottom portion or surface 289B of the member housing 289 may be configured to contact the exposed top surface of the upper most leaf 214 in the "home" position. In the illustrated exemplary embodiment, the bottom surface 289B of the member housing 289 is smooth and rounded to as to prevent scratching, denting or otherwise marring a leaf 214. The gauge 210 may be configured such that the bottom surface 289B of the member housing 289 is able to travel at least within 2 mm of the bottom portion 220 of the housing 212.

The member housing 289 may be configured with a void in which the manually engageable member 252 is received in, extends from, and is able to slide or otherwise move within, as shown in FIG. 7. For example, the manually engageable member 252 and the member housing 289 may include a movement limit mechanism 253 to limit the degree of travel therebetween, such as to limit movement at least generally along the actuation axis X3-X3. The movement limit mechanism 253 may be any mechanism capable of limiting movement between the manually engageable member 252 and the member housing 289. In some embodiments, the movement limit mechanism 253 may prevent the manually engageable member 252 from sliding or otherwise traveling out of, and thereby being removed from, the member housing 289 (e.g., sliding out of the top of the member housing 289). The movement limit mechanism 253 may also limit the amount of travel of the manually engageable member 252 into the member housing 289 (e.g., towards the bottom of the member housing 289). The member housing 289 may be sized, shaped and otherwise configured to be received within the channel 284 and travel therewithin at least generally along the actuation axis X3-X3.

As shown in FIGS. 5-7, the measurement determination mechanism 250 may further include a magnetic strip encoder 294, electrical contact strips 290, an electrical ring 292, an encoder reading integrated circuit (IC) 296, a primary return spring 297 and a force limit spring 298. For example, as shown in FIG. 6 the member housing 289 may include an encoder magnetic strip 294 along the length of a face of the member housing 289, and an electrical contract strip 290 on at least two other faces of the member housing 289. As another example, the encoder reading IC 296 may be mounted in the boss 286 and operably configured and orientated such that it is able to read the magnetic strip encoder 294 on the member housing 289 as the member housing 289 travels along the actuation axis X3-X3 within the channel 286. In this way, the encoder reading IC 296 may be operable to determine how far the magnetic strip encoder 294, and thereby the member housing 289, travels into/within the channel 284 and interior of the housing 212. The fewer leaves 214 in the "home" position (i.e., the greater the number of leaves 214 in the "extended" position), the more the magnetic strip encoder 294 and the components of the measurement determination mechanism 250 coupled thereto, including the bottom surface 298 of the member housing 289, can travel into the interior of the housing 212 until the "home" leaves 114 are relatively tightly stacked (i.e., gap 288 substantially removed). Similarly, the greater the number of leaves 214 in the "home" position (i.e., the fewer the leaves 214 in the "extended" position), the less the magnetic strip encoder 294 and the components of the measurement determination mechanism 250 coupled thereto, including the bottom surface 298 of the member housing 289, can travel into the interior of the housing 212.

The boss 286 may also include a component space or surface 299 adjacent the encoder reading IC 296, as shown best in FIGS. 5 and 7. In some embodiments, the exemplary gauge 210 may include a PCB positioned at least partially within the component space 299. The PCB may be operable coupled to the encoder reading IC 296, such as through soldering or other electrical connection. The PCB may also be operably coupled to another circuit board or electrical component, such as a circuit board that includes at least one of support elections, a battery, a wireless or wired transmitter, a processor, digital display and any other electrical or digital component.

A PCB or other electrical component of the gauge 210, potentially positioned on or within the boss 286, may be operably coupled to the electrical contact strips 290. For example, gauge 210 may include a PCB with electrical contacts or wires that are operably coupled to wiping contacts or the like configured for interaction with the electrical contact strips 290 of the member housing 289. As shown in FIG. 6, the electrical contact strips 290 may include a portion on the top edge or surface of the member housing 289. In such a configuration, the electrical ring contact 292 may be coupled to the manually engageable member 252 in such a manner that in a neutral or non-actuated position, such as that shown in FIG. 7, the electrical ring contact 292 is spaced form the electrical contact strips 290 provided on the top edge or surface of the member housing 289. As the manually engageable member 252 is movable within the member housing 289, at least to a certain extent, the gauge 210 may be configured to detect or recognize when the manually engageable member 252 slides down into the member housing 289 such that the electrical contact ring 292 makes electrical contact with the electrical contact strips 290. In some alternative embodiments, the contact strips 290 and electrical contact ring 292 may not be provided, and another switch mechanism may be used for a same or similar purpose. For example, a micro switch or optical switch may be used as opposed (or in addition to) the contact strips 290 and electrical contact ring 292.

The movement of the engageable member 252 (and thereby the ring contact 292 coupled thereto) and the member housing 289 (and the magnetic encoder strip 294 and electrical contact strips 290 coupled thereto) within the channel 284 and the interior of the housing 212 may be controlled, determined, based or otherwise predicated on the primary return spring 297 and the force limit spring 298, as best shown in FIG. 7. For example, with reference to FIG. 7 the primary return spring 297 may be effective in providing resistance between the engageable member 252 and the boss 286, and thereby the housing 212. Similarly, the force limit spring 298 may be effective in providing resistance between the engageable member 252 and the member housing 289.

In the exemplary embodiment, the force limit spring 298 is positioned within the cavity of the member housing 289 and positioned between the bottom of the cavity and the lower end of the "stem" of the engageable member 252, as shown in FIG. 7. As also shown in FIG. 7, the primary return spring 297 may be positioned between the head of the engageable member 252 and the top of the boss 286 of the housing 212. In such an arrangement, the spring constant of the force limit spring 298 may be greater than the spring constant of primary return spring 297. Further, in some such embodiments the gauge 210 may be configured so that, in a natural or neutral state, the electrical contact ring 292 coupled to the engageable member 252 is spaced from the electrical contact strips 290 coupled to the member housing 289, and the bottom portion or surface 289B of the member housing 289 is sufficiently retracted such that at least the top leaf 214 of the gauge 210 is capable of being in the "home" position without substantial deformation. As such, the exemplary illustrated feeler gauge 210 of FIGS. 4-7 may be enabled to provide a digital measurement of a gap or clearance through a measurement of any "home" leaves 214, as shown in FIG. 5.

More particularly, a user of the exemplary illustrated feeler gauge 210 initiate a measurement of a particular clearance or the like by selectively, individually rotating leaves 214 about the axis of rotation X-X between the "home" position and an "extended" position, as discussed above. Once the user has determined a particular measuring blade (i.e., one or more extended leaves 214) that corresponds in thickness to the particular clearance being measured, the user can manually engage the head of the engageable member 252 and apply force along the actuation axis or direction X3-X3. As the spring constant of the force limit spring 298 is greater than the spring constant of primary return spring 297, the force applied by the user will be transferred from the engageable member 252, through the force limit spring 298 and to the member housing 289 such that the primary return spring 297 is compressed and the engageable member 252, member housing 289 and force limit spring 298 slide through the channel 284 into the interior of the housing 212 actuation axis or direction X3-X3. In this way, the user can force the bottom portion or surface 289B of the member housing 289 into contact with the top surface of the upper most leaf 214 in the "home" position in the housing 212. After such contact with the upper most leaf 214 in the "home" position, further translation of the of the member housing 289 applies a compressive force to the leaves 214 in the "home" position between the bottom portion or surface 289B of the member housing 289 and the bottom portion 220 of the housing 212. Compression of the "home" leaves 214 will tend to bend or otherwise deform the "home" leaves 214 to substantially eliminate any gaps or spacing 288 between the leaves 214 resulting from one or more of the leaves 214 being in the "extended" position, as best shown in FIG. 5. Once the "home" leaves 214 reach a certain compressed state, the reaction force applied against the member housing 289 may be great enough to compress the force limit spring 298 between the member housing 289 and the engageable member 252. As the force limit spring 298 is compressed, the engageable member 252 travels deeper within the member housing 289 such that the spacing between the electrical contact ring 292 (coupled to the engageable member 252) and the electrical contact strips 290 (coupled to the member housing 289) is substantially eliminated. In such an embodiment, the force limit spring 298 may be chosen or configured to ensure enough force is applied to the "home" leaves 214 to ensure any gap 288 therebetween are eliminated before the force limit spring 298 "gives way" and the electrical contact ring 292 contacts the contact strips 290. The gauge 210 may be configured to recognize such contact of the electrical contact strips 290 and the electrical contact ring 292 (i.e., closing of the circuit) and, at such time, determine how far the member housing 289 has traveled into the housing 212 via the magnetic strip 294 and the encoder reading IC 296 (e.g., how many segments have passed the encoder reading IC 296). As discussed above, the gauge 210 may be configured or calibrated to equate the travel distance of the member housing 289 to the thickness of the "home" leaves 214. Thereby, the gauge 210 may also be configured to contrast the thickness of the "home" leaves 214 against the thickness of all of the leaves 214 of the gauge 210 to determine the thickness of the "extended" leaves 214 representing the thickness of the clearance being measured.

In some alternative embodiments, the gauge 210 may not include or utilize at least one of the limit spring 298, electrical contact strips 290 and the electrical contact ring 292 as the mechanism(s) that applies compressive force to the "home" leaves 214 and initiates reading of the thickness of the "home" leaves 214 after a certain degree or amount of compressive force is applied. In such embodiments, the force applied to the "home" leaves 214 by the member housing 289 may, instead, be set by an internal plunger that closes a switch. In some such embodiments, the member housing 289 may include and utilize a linear array, or a rectangular photodiode, applied to a length of the plunger. The member housing 289 may include a series of apertures or other passageways for monitoring the position of the plunger, and gauge 210 may be configured to infer when the force limit has been reached (i.e., when a pre-determined amount of force needed to substantially eliminate any gaps 288 between adjacent "home" leaves 214).

Figure 8:
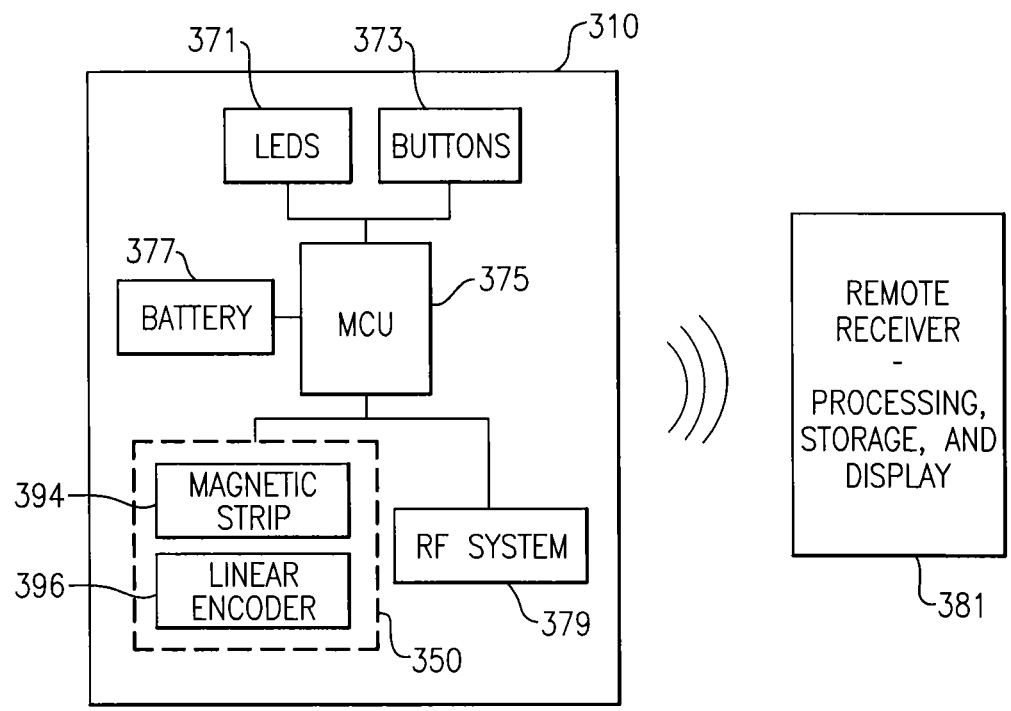
FIG. 8 is a schematic of exemplary electronic components of the third exemplary feeler gauge of FIG. 4.

FIG. 8 illustrates an exemplary block diagrammatic of the electrical or electronic components of the feeler gauge according to the present disclosure. Specifically, the exemplary schematic of FIG. 8 illustrates exemplary electrical or electronic components that may be included in the feeler gauge 210 of FIGS. 4-7 described herein. The description herein with respect to the other exemplary digital feeler gauges, including description regarding alternative embodiments (i.e., modifications, variations or the like), equally applies to exemplary feeler gauge 310 (and any alternative embodiments thereof) illustrated in FIG. 8.

As shown in FIG. 8, the exemplary feeler gauge 310 may be powered by a power source 377, such as a battery. However, the power source 377 may be any other power source effective in providing power to the feeler gauge 310. For example, the power source 377 may be external means (such as via an outlet and cord) or provided by an on-board power generator. The power source 377 may be effective in providing electrical current (AC or DC) to other components of the feeler gauge 310.

One component that may be powered by the power source 377 is a microprocessor 375. The exemplary microprocessor 375 may include an integrated circuit having at least one processor core, memory, programmable input/output peripherals, etc. The microprocessor 375 may provide, at least partially, the computing power or capability to the feeler gauge 310. The microprocessor 375 in one example is configured to receive signals from other components operably coupled thereto, and provide or control the same or other components or processes in response thereto. For example, the microprocessor 375 may be configured to receive one or more signals from the measurement determination mechanism 350 and utilize the one or more signals to determine the gap or clearance measurement. In gauge embodiments wherein the gap or clearance measurement is determined via the positioning of the leaves 314 (not shown) in the extended position, the microprocessor 375 may receive and utilize one or more signals corresponding to the extended leaf or leaves 314 via the measurement determination mechanism 350 and produce signal or data corresponding the gap or clearance. In gauge embodiments wherein the gap or clearance measurement is determined via the thickness measurement of the leaves 314 in the extended position, the microprocessor 375 may receive and utilize one or more signals corresponding to the thickness of the extended leaf or leaves 314 via the measurement determination mechanism 350 and produce signal or data corresponding the gap or clearance. Similarly, on gauge embodiments wherein the gap or clearance measurement is determined via the thickness measurement of the leaves 314 in the home position, such as exemplary feeler gauge 310, the microprocessor 375 may receive and utilize one or more signals corresponding to the thickness of the "home" leaf or leaves 314 via the measurement determination mechanism 350 and produce signal or data corresponding the gap or clearance. In the illustrated exemplary embodiment, the microprocessor 375 may receive one or more signals from the encoder reading IC 296 reflective of the movement of the magnetic strip 294. The microprocessor 375 may be configured to utilize those signals to determine the thickness of the gap or clearance, such as by determining the thickness of the "home" leaves 314 from the one or more signals from the encoder reading IC 296 and contrast it against the overall thickness of the all of the leaves 314 of the gauge 310. In some embodiments, the gap or clearance may be determined through one or more lookup tables, calculations, combinations thereof, etc.

As mention above, the microprocessor 375 may be configured to receive and/or send signal, data or other electronic "instructions" with other components of the feeler gauge 310. For example, the exemplary illustrated feeler gauge 310 of FIG. 8 includes at least one visual indication component 371 and at least one engageable button 373. The microprocessor 375 may be programmed or otherwise configured to activate the at least one visual indication component 371 during certain stages or periods of the gap or clearance measurement and/or processing, storing, transmitting or otherwise handling the clearance measurement signal(s) or data. Then visual indication components include a display such as an LCD or LED display. The display can indicate the numeric values or other indication mechanisms such as bars or lines.

A further feature includes an audio chipset (not shown) coupled to the processor. The audio chip set in one example provides an audible signal to the user to indicate the gap measurement or the measurement processing. For example, signal tones can be used to aid in the application of the compressive force applied to the leaves.

Similarly, the at least one engageable button 373 may be operably coupled to the microprocessor 375 such that the at least one engageable button 373 can be used to control the capturing, calculating, processing, etc. of the gap or clearance measurement.

As also shown in FIG. 8, the exemplary feeler gauge 310 in one example has an communications section 379 that may include an antenna, transceiver or another other mechanism effective to wirelessly transfer data or signals to a computing device 381, such as data or signals representing a gap or clearance measurement. Similarly, the exemplary feeler gauge 310 may include a port or other component for transfer data or signals to a remote or local device through a wired or other physical connection 381. The data in one example is transmitted to a local computing device of the operator and allows the operator to visualize the measurements as well as consider diagnostic and prognostic aspects of the system associated with the gap measurement. For example, the gap measurement may indicate a faulty condition if not within the preferred range. Historical data of prior measurements can also be used to determine the change over time and facilitate maintenance.

As detailed herein, one embodiment for sensing or determining the leaves either extended or home is to include a sensor section 350 integrated with the gauge. In one example the sensor section 350 employs magnetic strips 394 and a linear encoder 396.

The sensing to determine which of the leaves are extended or home, or the actual thickness of the extended and/or home leaves, can also be accommodated using sensors that are capacitor-based, optical-based, resistor-based, magnetic-based, inductance-based, notch pattern-based or combinations thereof. In a further embodiment, a mechanical sensor such as a radial dial can be used to mechanically measure the thickness of the extended and/or home leaves with sufficient accuracy. The dial in one example has markings corresponding to the thickness.

Figure 9:
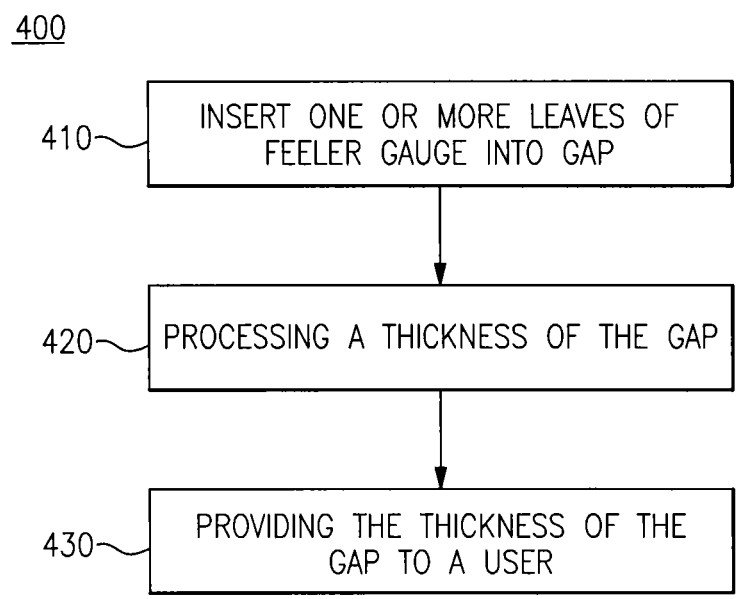
FIG. 9 is a flow chart perspective view of the processing involved in the gap thickness determination according to one embodiment.

Referring to FIG. 9, a process 400 for measuring a thickness of a gap using a feeler gauge according to one embodiment is depicted. In operation, the user or operator extends one or more leaves from the gauge and inserts the leaves into the gap 410. The user may iterate the process until the correct leaves are inserted in the gap, wherein the leaves may or may not be adjacent or consecutive to one another in terms of thickness. The gauge can then be used to determine the thickness of the gap 420. In one example the gauge sensor uses a manual method to apply a compressive force to the extended leaves, the home leaves or both. The measurement can be processed to determine the gap thickness or directly displayed by the sensor. In another example the thickness of the gap is calculated by determining which leaves are in the extended position and/or which leaves are in the home position. Knowing the thickness of the leaves and the position of the leaves (home or extended), allows for determination of the thickness of the gap. Sensors can be used to determine the position of the leaves including sensors that are capacitor-based, optical-based, resistor-based, magnetic-based, inductance-based, notch pattern-based or combinations thereof.

The gap thickness can then be provided to the user 430. In one example the gauge includes a processor and/or transmitter that communicate the signal representative of the gap thickness to a computing device via wireless or wired mechanisms. The computing device can be, for example, a local computing device of the user such as an iPhone® or iPod® with an application designed to receive and process the signal. The signal can be transmitted to a remote location such as the facilities or maintenance center that can store the data and/or use the data for diagnostics or prognostics. The gauge in one example user notification includes audio capability to announce the gap thickness to the user, wherein the audio capability can be incorporated with the gauge or with the local device of the user such as in an personal digital assistant such as tablets, netbooks, and mobile phones. In a further example, the gap measurements are logged and processed with historical data of gap measurements for the device itself or the device specifications. If the gap measurements are trending or outside of the appropriate range, appropriate maintenance action can be taken.

It is to be understood that the above description is intended to be illustrative, and not restrictive. Numerous changes and modifications may be made herein by one of ordinary skill in the art without departing from the general spirit and scope of the invention as defined by the following claims and the equivalents thereof. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein."Moreover, in the following claims, the terms "first," "second," and "third," etc. are used merely as labels, and are not intended to impose numerical requirements on their objects. Also, the term "operably connected" is used herein to refer to both connections resulting from separate, distinct components being directly or indirectly coupled and components being integrally formed (i.e., monolithic). Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure. It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the disclosure may include only some of the described embodiments. Accordingly, the invention is not to be seen as limited by the foregoing description, but is only limited by the scope of the appended claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A feeler gauge for measuring the thickness of a gap, the gauge comprising:
   a plurality of measuring leaves rotatably coupled along a common axis of rotation and being selectively movable between a home position and an extended position, wherein each measuring leaf defines an elongate, substantially flat shape defining a leaf thickness, and wherein one or more extended leaves can be inserted into the gap such that the combined leaf thickness of the one or more extended leaves substantially corresponds to the thickness of the gap; and a measurement determination mechanism configured to determine the thickness of the gap by at least one of detecting which of the leaves are in the extended position and calculating the thickness, detecting which of the leaves are in the home position and calculating the thickness, measuring the total thickness of the leaves in the extended position, and measuring the total thickness of the leaves in the home position;

wherein the gauge is configured to perform at least one of display the thickness, transmit a signal representing the thickness to a computing device, store the thickness locally for later processing, and provide user notification.

2. The gauge of claim 1, wherein the measurement determination mechanism includes a manual engageable member configured to measure at least one of the thickness of the leaves in the extended position or the thickness of the leaves in the home position.

3. The gauge of claim 2, wherein the leaves are not consecutive in thickness.

4. The gauge of claim 1, wherein the measurement determination mechanism comprises at least one sensor to determine which of the leaves are in the extended position, home position, or combinations thereof.

5. The gauge of claim 1, wherein the measurement determination mechanism comprises at least one sensor to determine an actual thickness of the leaves in the extended position, home position or combinations thereof.

6. The gauge of claim 1, wherein the user notification is at least one of providing audible tones and providing an audible signal of the measurement.

7. The gauge of claim 1, further comprising a housing, wherein the housing includes an upper member, a lower member and an interior cavity between the upper and lower members, and wherein a leaf is in the home position when the leaf is oriented about the axis of rotation such that the leaf is positioned substantially in the interior cavity of the housing.

8. The gauge of claim 7, wherein the measurement determination mechanism includes a compression member configured to apply a compressive force to a portion of the leaves in the home position distal the axis of rotation of a degree sufficient to at least substantially eliminate space between the portion of the leaves.

9. The gauge of claim 1, wherein the gauge is configured to automatically measure the thickness of the gap once sufficient force to substantially compress the leaves in the home position is applied.

10. A feeler gauge for measuring the thickness of a gap, the gauge comprising:

a housing including a top member, a bottom member and a cavity between the top and bottom members;

a plurality of elongate, substantially flat measuring leaves each defining a thickness, wherein the leaves are rotatably coupled along a common axis of rotation within the cavity of the housing at a first portion proximate the leaves, wherein the leaves are selectively rotatable about the axis of rotation between a home position where a second portion of the leaves distal the first portion is positioned substantially within the cavity of the housing and an extended position where the first portion is substantially spaced from within the cavity of the housing, and wherein one or more extended leaves can be inserted into the gap such that the overall thickness of the one or more extended leaves substantially corresponds to the thickness of the gap; and a measurement determination mechanism configured either to measure the thickness of the gap by determining the thickness of the leaves in the extended position or home position, or to determine which of the leaves are in the extended position or home position, and wherein the gauge is configured to at least one of display the thickness, transmit a signal representing the thickness to a computing device, store the thickness locally for later processing, and provide user notification.

11. The feeler gauge of claim 10, wherein the measurement determination mechanism includes a manually engageable moveable member configured for translation within at least one of the first and second members of the housing proximate the second portion of the leaves, into the cavity of the housing and into contact with an adjacent leaf in the home position.

12. The feeler gauge of claim 11, wherein the manually engageable moveable member is configured to apply a compressive force to the leaves in the home position between the manually engageable moveable member and at least one of the first and second members of the housing of a sufficient degree to at least substantially eliminate space between the leaves in the home position.

13. The feeler gauge of claim 10, wherein the gauge is configured to automatically measure the thickness of the gap once the said compressive force of a sufficient degree is applied.

14. The feeler gauge of claim 13, wherein the measurement determination mechanism is configured to detect the amount of translation of the manually engageable moveable member from a neutral position to an actuated position, wherein the actuated position is defined by the position of the manually engageable moveable member when the compressive force of a sufficient degree is applied.

15. The feeler gauge of claim 14, wherein the gauge is configured to determine the thickness of the leaves in the home position based on the amount of translation of the manually engageable moveable member and the thickness of the gap being measured by contrasting thickness of the leaves in the home position with total thickness of all leaves in the gauge.

16. The feeler gauge of claim 10, comprising at least one processor coupled to the measurement determination mechanism, and further comprising at least one of a digital display, a communications section, and a user notification section.

17. A method of measuring thickness of a gap, comprising:

inserting one or more measuring leaves of a feeler gauge into the gap, said feeler gauge comprising a housing with said one or more measuring leaves rotatably coupled to the housing along a common axis of rotation, said measuring leaves being selectively movable between a home position and an extended position;

measuring a total thickness of the leaves by at least one of detecting which of the leaves are in the extended position, detecting which of the leaves are in the home position, measuring the total thickness of the leaves in the extended position, and measuring the total thickness of the leaves in the home position.

18. The method of claim 17, further comprising calculating the total thickness of the gap by processing at least one of number of leaves in the extended position or number of the leaves in the home position.

19. The method of claim 17, further comprising communicating the total thickness of the gap to an operator.

20. The method of claim 17, further comprising applying a compressive force to the leaves of a sufficient degree to at least substantially eliminate space between the leaves when measuring.

* * * * *